Figure 1:
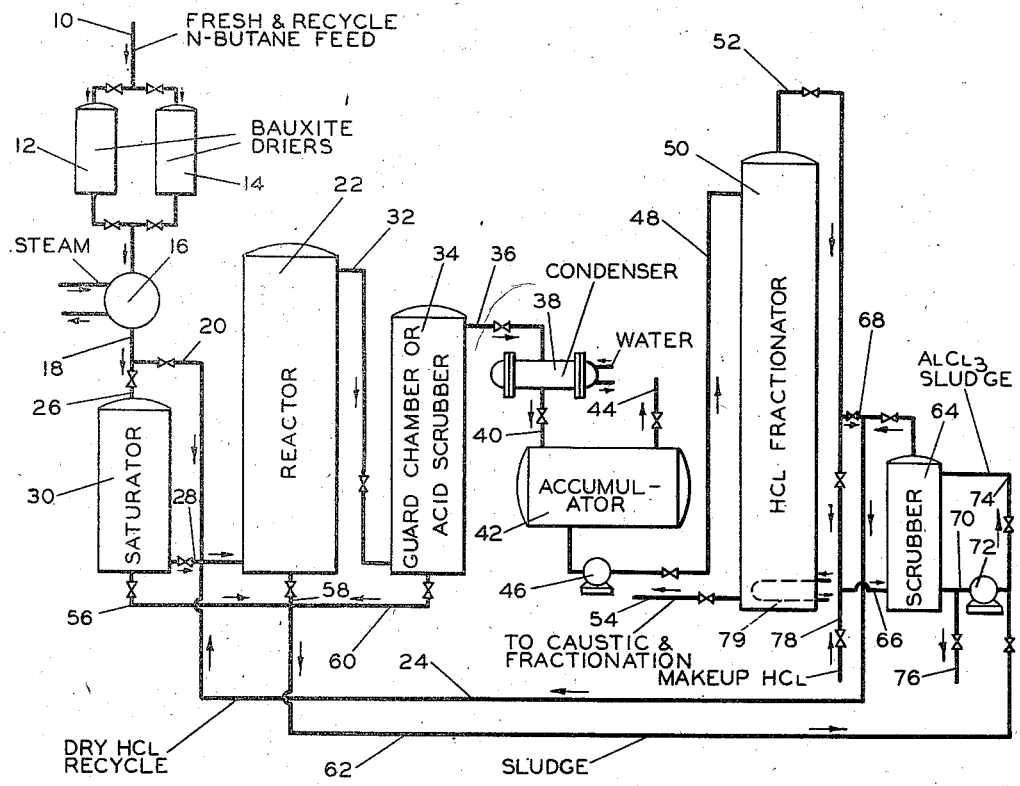

March 2, 1948.  P. L. ROBERTS  2,436,900
METHOD FOR THE REMOVAL OF TRACES OF WATER FROM MIXTURES OF
HYDROGEN CHLORIDE WITH LOW-BOILING HYDROCARBONS
Filed Dec. 31, 1943

INVENTOR
P. L. ROBERTS
BY Hudson, Young + Yinger
ATTORNEYS

Patented Mar. 2, 1948

2,436,900

UNITED STATES PATENT OFFICE 2,436,900

METHOD FOR THE REMOVAL OF TRACES OF WATER FROM MIXTURES OF HYDROGEN CHLORIDE WITH LOW-BOILING HYDROCARBONS

Perry L. Roberts, Bartlesville, Okla., assignor to Phillips Petroleum Company, a corporation of Delaware Application December 31, 1943, Serial No. 516,507

7 Claims. (Cl. 260—683.5)

This invention relates to the removal of water from hydrogen chloride containing materials. In a particular embodiment it relates to the removal of traces of water from mixtures of hydrogen chloride with light hydrocarbons. A specific application of the invention relates to the drying of hydrogen chloride recycle streams in catalytic conversion processes wherein anhydrous metal halide catalysts activated with hydrogen chloride are utilized. The invention also relates to an advantageous method of utilizing liquid metal halide sludges, such as those formed in such conversion processes.

Of great commercial interest at the present time are the isomerization and alkylation of low-boiling hydrocarbons, particularly members of the paraffin series, such as butanes and pentanes. These reactions, carried out with the hydrocarbons in liquid or in vapor phase, are known to be catalyzed to a greater or lesser extent by the so-called Friedel-Crafts type metal halide catalysts, among the better known of which may be mentioned the aluminum halides, particularly aluminum chloride and aluminum bromide, zinc chloride, ferric chloride, boron fluoride, zirconium tetrachloride, and other polyvalent metal halides. Aluminum chloride has to date received the greatest commercial acceptance due to its activity, relatively low cost, and availability. Accordingly, because of its importance and for the sake of convenience, I shall describe my invention with particular reference to the vapor-phase isomerization of normal butane to isobutane as catalyzed by anhydrous aluminum chloride. Application of the invention to other hydrocarbon conversions, using aluminum chloride or other Friedel-Crafts type metal halide catalysts which form sludges under the conditions of operation, will be apparent to those skilled in the art.

Aluminum chloride and other metal halide catalysts of the type described are almost always activated by small amounts of hydrogen chloride or other hydrogen halides, the halide of the activator usually corresponding to the halide of the catalyst. Inasmuch as the metal halide catalysts are most effective in a substantially anhydrous condition, considerable care must be taken to insure that the catalytic system is substantially free from water. In spite of the usual precautions taken, water frequently is found within the system, and while a very limited amount may be tolerated it is ordinarily preferred to remove the water to as large an extent as possible. In the treatment and segregation of various streams within processes of the type described a hydrogen chloride-rich stream is frequently formed which contains minor amounts of water. It is to the drying of such streams that this invention is particularly directed. It will be appreciated that the invention may be applied with suitable modifications to other hydrogen chloride-containing streams obtained in other manners than those specifically described herein.

In the catalysis of organic reactions, such as isomerization of saturated hydrocarbons, with aluminum chloride and other anhydrous metal halide catalysts, a liquid sludge is frequently formed or used which comprises the metal halide in combination with organic material. The exact chemical nature of these sludges is not fully understood, but it appears that the sludges usually contain some free or readily available metal halide, together with metal halide more tightly bound in the form of metal halide-hydrocarbon complexes or the like. The activity of the sludge depends upon the conditions under which it is formed, and it may contain no free aluminum chloride. The amount of sludge formed in a given conversion varies greatly with reactants and reaction conditions, but in any case a substantial and sometimes predominant proportion of the chemical cost is charged against the sludge. Any method of utilizing sludge accordingly aids in reducing the cost of the process.

When normal butane is isomerized to isobutane, aluminum chloride and hydrogen chloride may be used to catalyze the reaction. In a typical process the normal butane is dried, admixed with a minor amount of hydrogen chloride, contacted with aluminum chloride in a primary reaction chamber, and then passed into a secondary chamber which contains a solid adsorbent material. As examples of the adsorbent material which may be used may be mentioned activated charcoal, activated alumina, fuller's earth, and natural and artificial zeolites, silica gel, various natural and synthetically prepared clay-like materials, bauxite, particularly a specially prepared low iron-content bauxite sold under the name of "Porocel," etc. These materials may first be calcined to any desired extent prior to use. In the secondary chamber aluminum chloride contained in the effluent from the primary chamber is adsorbed and/or deposited on the solid adsorbent. The effluent from the secondary chamber is then passed through any suitable means for removing residual volatilized aluminum chloride therefrom, as for example through a guard chamber packed with "Porocel" or equivalent adsorbent or, more preferably, through a scrubber tower countercurrently to concentrated sulfuric or phosphoric acid. In this way aluminum chloride is removed from effluent vapors before passing the same to subsequent equipment. The so-treated effluents are passed through water-cooled condensers or the like and the condensate is fed to a fractionator or stripper. In this fractionator or stripper the hydrogen chloride is removed overhead in admixture with light hydrocarbons in varying amounts. These light hydrocarbons may comprise propane and lighter introduced with the feed and/or produced by side reactions in the process, and may also comprise hydrogen. It has been found that water present in the fractionator feed works its way up the column and passes out in substantial amounts with the overhead product. This overhead product, then, may contain from 10 to 85 mol per cent or more, usually at least 35 per cent, hydrogen chloride, together with light hydrocarbons, and the water content, although usually below one per cent based on the HCl content, is sufficient to decrease the efficiency of the process when the stream is recycled to contact with the catalyst. It is frequently this stream having the highest concentration of HCl in the system which requires drying. Removal of moisture is important in that it minimizes corrosion of equipment.

Such a stream is not amenable to the usual dehydrating treatments. Most chemical means are unsatisfactory because of the highly reactive nature of the hydrogen chloride, which is frequently present as at least 50 mol per cent, and usually at least 35 mol per cent, of the stream. The use of solid adsorbent desiccants, such as dehydrated bauxite, is unsatisfactory because the acidic HCl is as strongly adsorbed as is the water (see for example Chemical and Metallurgical Engineering 50, July, 1943, pages 107-110, especially page 108, column 2). Desorption to recover HCl for re-use also desorbs the water along with the HCl. Furthermore, it is usually quite small amounts of water which are to be removed from a large volume of other material, and to effect complete or in fact any removal of such traces is an exceptionally difficult undertaking.

In order to minimize the amount of water in the system many precautions are normally taken in the operation of a plant such as the one disclosed. These precautions include a careful drying of feed hydrocarbons. However, moisture almost invariably enters the system from one or more sources which may include inefficient drying of the feed, desorption of water from a spent desiccant, leakage of steam from heaters and steam tracing or jacketing of conduits, leakage of water from water-cooled condensers, desorption from the solid adsorbent in the reaction chamber, desorption from sulfuric acid in an effluent scrubber, backing up of aqueous caustic solution from the caustic wash generally applied to the kettle product of a hydrogen chloride fractionator, etc. Water also enters the system whenever a portion is shut-down and opened to the atmosphere for inspection or charging of catalyst.

It is an object of this invention to provide a method for separating water from hydrogen chloride-containing material.

Another object is to provide a method of drying mixtures of concentrated hydrogen chloride and hydrocarbons.

A further object is to make use of aluminum chloride-containing sludge formed in hydrocarbon conversions.

A further object is to improve the operation of a butane isomerization process in which an aluminum chloride catalyst activated with hydrogen chloride is used.

Yet another object is to remove water from HCl-containing streams having only a trace of moisture therein.

Further objects and advantages of the invention will be apparent, to one skilled in the art, from the accompanying disclosure and discussion.

In processes of the type described a liquid sludge is usually formed after a short period of operation. This sludge may comprise complexes of aluminum chloride with hydrocarbons as well as dissolved aluminum chloride. Ordinarily this sludge is not utilizable per se in the process, and its formation represents an undesirable loss of catalyst. I have found that this sludge may be used to remove water from hydrogen chloride-containing streams even when the water content of such streams is extremely small. In a preferred embodiment of my invention as applied to a normal butane isomerization process, I recover a hydrogen chloride-rich stream from the conversion effluents by fractionation of such effluents. This stream, as explained above, contains a substantial portion of the water in the system. Accordingly, I contact the stream with sludge formed in the catalyst chambers or in other portions of the system. A relatively short contact time is sufficient to remove a substantial part or all of the water present in the stream. The thus-dried hydrogen chloride stream is then introduced into the reaction chamber for further use as catalyst activator.

Figure 2:
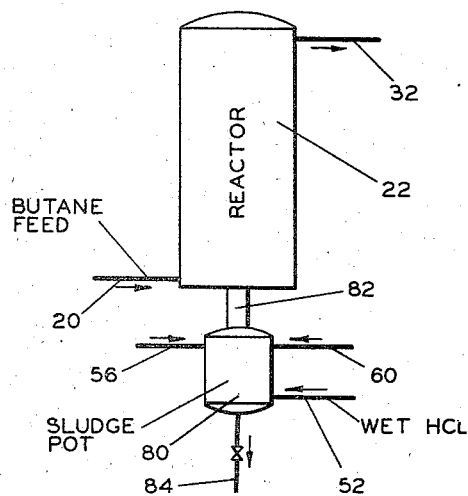

The various features of the invention may be more fully understood by reference to the accompanying drawing. Figure 1 portrays somewhat diagrammatically a preferred arrangement of equipment for practicing the invention in conjunction with a butane isomerization process. Figure 2 illustrates a preferred modification of the reaction chamber wherein the recycle stream is treated in accordance with the principles of the invention. It will be appreciated that various auxiliary elements of equipment such as control valves, temperature regulators, compressors, etc., may be supplied as required by one skilled in the art. It will also be understood that the drawing and description thereof represent merely a preferred example, and other applications of the invention may be made without departing from the spirit thereof.

In Figure 1, normal butane from any suitable source, together with recycled unconverted normal butane, is passed from line 10 through drying units 12 or 14 which contain dehydrated bauxite or other suitable desiccant. Two such units are provided so that one may be taken off stream and regenerated as required. The dried feed is next heated in unit 16 by heat exchange with steam or other suitable means. It may be passed via lines 18 and 20 into the bottom of a reaction chamber 22. This reaction chamber is charged with "Porocel" or other adsorbent mixed with or impregnated with anhydrous aluminum chloride. Hydrogen chloride is introduced from line 24 into admixture with the butane feed, and the reaction mixture passed in the vapor phase through reactor 22 wherein substantial conversion of normal butane to isobutane occurs. Pressures maintained are generally superatmospheric pressures which permit the reaction mixture to remain in vapor phase at the temperatures employed. Reaction temperatures may vary from about 175 to 325° F., but are generally within the range of about 225 to 300° F. For example, when starting with a fresh catalyst, a temperature of about 230° F. and a pressure of about 225 pounds per square inch gauge are maintained. As the activity of the catalyst decreases, the temperature is raised up to a value of about 300° F. to maintain the rate of conversion. At this point the catalyst is replaced or reactivated. In a preferred manner of carrying out such a reactivation the flow of hydrogen chloride is stopped and a portion of the hydrocarbon feed vapors is passed via lines 26 and 28 through a saturator 30 filled with lump aluminum chloride. Sufficient aluminum chloride is sublimed in this manner and passed to reactor 22 wherein it is adsorbed to restore the activity of the catalyst to the desired extent. The feed inlet temperature is then lowered to 230° F. again, and after lining out the operation the hydrogen chloride is again introduced. The concentration of hydrogen chloride in the total feed to the reaction is held usually within the range of about 2 to about 5 mol per cent, although values outside this range may sometimes be suitable.

Vapors are passed from the top of reactor 22 via line 32 through a unit 34 designed to remove aluminum chloride vapors. Unit 34 may, for example, comprise a bed of solid adsorptive material which may be similar to that used in reactor 22. Preferably, unit 34 comprises a sulfuric acid scrubber in which the vapors are contacted with 85 per cent or stronger sulfuric acid which effects the substantially complete removal of aluminum chloride. Treated vapors are removed from the guard chamber or scrubber 34 and passed via line 36 to condenser 38. The condensate is run via line 40 into fractionator accumulator 42. Small amounts of light gases which accumulate in the system may be periodically or continuously removed from the top of the accumulator 42 through line 44 to avoid pyramiding in the system. Liquid is pumped from accumulator 42 by means of pump 46 and passed via line 48 as feed and reflux to the top of the HCl stripper 50, which is heated by heater 79. Substantially all the hydrogen chloride is taken off overhead in an HCl-rich stream via line 52 in admixture with light hydrocarbons, while a kettle product comprising isobutane product and unconverted normal butane is recovered via line 54. This kettle product is passed to a caustic wash, not shown, for the removal of traces of hydrogen chloride and aluminum chloride, and is then fractionated by means not shown to recover the isobutane product and unconverted normal butane, which latter is recycled through line 10. A part or all of the recycle normal butane may be fractionated to remove small amounts of pentanes and heavier material formed by side reaction. The overhead product in line 52 is generally obtained as a vapor, and may be maintained in the vapor phase while being recycled to the reactor. In some cases a partial condensation may be made, with the uncondensed HCl-rich gas being recycled while the condensate is returned to column 50 as reflux. Or a liquid HCl-containing stream may in some instances be recycled to the reactor. As an example of a typical operation, 55,000 gallons per day liquid feed is passed to the top of a 45-tray fractionator at 130° F. A kettle temperature of 210° F. is maintained, and a gaseous overhead stream is taken off at 100° F. which contains 60 mol per cent HCl. The non-HCl portion of this stream, representing 40 per cent of the total stream, analyzed as follows:

| | Mol per cent |
|---|---|
| Air | 1.0 |
| Hydrogen | 9.7 |
| Methane | 32.0 |
| Ethane | 0.5 |
| Propane | 9.6 |
| Isobutane | 34.0 |
| N-butane | 13.2 |
| | 100.0 |

As the conversion proceeds in reactor 22 small amounts of liquid aluminum chloride-containing sludge may be formed and run down to the bottom of the reactor. Limited amounts of sludge may also form in saturator 30 and in guard chamber 34. In the process operated under conditions as just described, the amount of sludge formation is quite small and it is accordingly not ordinarily economically feasible to attempt to utilize the sludge for carrying out other reactions or in the various other manners which have been previously suggested. However, the amount formed is generally sufficient for use in drying the recycle HCl stream in accordance with my invention, and accordingly is effectively utilized. The sludge may be withdrawn from any point in the system in which it accumulates by means of lines such as 56, 58, and 60 passed through a line 62 or by any other suitable manner to scrubber unit 64. A part or all of the recycle HCl stream in line 52 is passed via line 66 into the bottom of scrubber 64 in either vapor or liquid phase, but usually and preferably the former. A portion may be by-passed if desired through line 68 into line 24. Scrubber 64 may be operated within a wide range of temperatures and pressures, but in the arrangement shown it is preferably operated at or near the temperature and pressure at which the HCl recycle stream is obtained from fractionator or stripper 50, such as in the range of 75–175° F., 100° F. for example, and at 175–450 pounds per square inch gage, with 250 pounds being common. Scrubber 64 may contain simply a pool of liquid sludge through which the vapors to be dried are bubbled or it may contain Raschig rings or other suitable packing material for promoting more intimate contact of sludge with the hydrogen chloride-containing stream. Sludge may be withdrawn from the bottom of scrubber 64 through line 70 and pumped by means of pump 72 or otherwise passed through line 74 for reintroduction at the top of the scrubber. A circulation may be maintained in this manner which will keep the packing material constantly wet with sludge.

I have found that contact of the hydrogen chloride-containing stream with sludge in the manner described effects the removal of water in a very satisfactory manner with a minimum of equipment and without the necessity of introducing any extraneous material into the process. The amount of water in the recycle stream may under unusual conditions attain a value of 5 or 10 per cent or even more, but ordinarily it is well below one mol per cent based on the hydrogen chloride content. It will be appreciated that the removal of such small quantities of water from an acid stream is something which cannot be done by ordinary means The sludge is ordinarily used in contactor 64 until the free aluminum chloride content, which is usually relatively large in the fresh sludge, drops to a low value. An advantage to be gained in the continuous circulation of sludge within scrubber 64 is the fact that the sludge becomes saturated with hydrogen chloride, and very little hydrogen chloride is therefore removed from the system, although absorbed HCl may be recovered from spent sludge, as by heating, if desired. Furthermore, at least part of the water-removing reaction serves to generate make-up HCl, which must otherwise be supplied to the system in larger amounts, as by line 79. The sludge may be removed continuously or intermittently through line 76 as it becomes spent.

There are further advantages to be gained in the location of the sludge contacting at this particular point in the system. These are due in part to the concentrating effect of the fractionator 50 which causes a substantial amount of water to go overhead. Furthermore, it is preferred to contact the concentrated hydrogen chloride stream with sludge in the presence of as small a proportion of butane and heavier hydrocarbons as possible in order to minimize consumption of hydrogen chloride by sludge-forming reactions, therewith, the nature of such reactions not being fully understood at this time. It is accordingly preferred to scrub the HCl recycle stream before it is admixed with the butane isomerization feed.

Figure 2 shows a modified form of reaction chamber 22 combined with a sludge scrubber which corresponds in function to scrubber 64 just described, but which has additional advantages of its own. It will be understood that the apparatus of Figure 2 may be introduced into the system shown in Figure 1 in place of reactor 22 and scrubber 64 by suitable piping connections. Insofar as possible the same numerals are used in both figures to designate like elements. A sludge pot 80 is provided at the bottom of reactor 22, connection between the two being made by a large conduit 82. Any sludge formed in the reactor drains into pot 80, and sludge from other points in the system may be introduced through lines such as 56 and 60 if desired. The HCl fractionator overhead is passed via line 52 into the bottom of sludge pot 80, wherein it contacts the sludge and is dried by reaction of its water content therewith. Pot 80 may contain packing material if desired to promote gas-liquid contact. The thus-dried hydrogen chloride passes up through conduit 82 into the reactor 22 wherein it becomes mixed with the butane feed and acts as catalyst activator. In this preferred arrangement sludge is supplied as formed to the top of sludge pot 80 and flows downwardly therethrough in contact with the HCl-rich stream to be dried. Spent sludge may be removed through line 84.

From the foregoing it will be seen that the present invention involves a simple, unique and advantageous means of removing water from hydrogen chloride-containing materials, especially from the overhead from an HCl fractionator operating on effluent from the aluminum chloride isomerization of normal butane. However, it is apparent that the invention may be applied to other processes involving the use or production of metal halide-containing sludges and hydrogen chloride or other hydrogen halides without departing from the spirit of the invention. Such sludges preferably contain some free metal halide, although sludges in which the metal halide is all combined may also be used.

I claim:

1. A process which comprises contacting normal butane in admixture with a minor catalyst-activating amount of hydrogen chloride in vapor phase with a solid aluminum chloride isomerization catalyst at isomerization conditions of temperature, pressure, and contact time to form isobutane, removing residual aluminum chloride from effluent vapors, subjecting conversion products comprising isobutane, unconverted normal butane, hydrogen chloride, and traces of water, to fractionation to recover a hydrogen chloride-rich vaporous stream containing a substantial proportion of said water, contacting said stream at a temperature within the range of 75 to 175° F. with a liquid aluminum chloride sludge derived from said catalyst and containing free aluminum chloride to remove water from said stream by reaction with said sludge, recovering unconverted normal butane from said conversion products and recycling to said catalyst, returning the thus-dried hydrogen chloride-rich stream to admixture with normal butane, and contacting said admixture with said catalyst as hereinabove described.

2. The process which comprises contacting normal butane in admixture with a minor catalyst-activating amount of hydrogen chloride, with an aluminum chloride isomerization catalyst at isomerization conditions of temperature, pressure, and contact time to form isobutane, subjecting conversion products comprising isobutane, unconverted normal butane, hydrogen chloride, and traces of water, to fractionation to recover a hydrogen chloride-rich stream containing a substantial proportion of said water, contacting at least a portion of said stream at a temperature within the range of 75 to 175° F. with a liquid aluminum chloride sludge to remove water from said stream, returning the thus-dried hydrogen chloride-rich stream to admixture with normal butane, and contacting said admixture with said catalyst as hereinabove described.

3. A method of removing small amounts of water from a system in which normal butane is isomerized to isobutane in the presence of an aluminum chloride catalyst activated with hydrogen chloride, which comprises concentrating by fractionation said water in a hydrogen chloride-rich stream containing less than about 1 mol per cent water based on the hydrogen chloride content, contacting said stream at a temperature within the range of 75 to 175° F. with a liquid aluminum chloride sludge formed from said catalyst by said isomerization to remove water from said stream, and returning the thus-dried stream to the system.

4. A method of removing small amounts of water from a system in which normal butane is isomerized to isobutane in the presence of an aluminum chloride catalyst activated with hydrogen chloride, which comprises concentrating said water in a hydrogen chloride-rich stream containing less than about 1 mol per cent water based on the hydrogen chloride content, contacting said stream at a temperature within the range of 75 to 175° F. with a liquid aluminum chloride sludge to remove water from said stream, and returning the thus-dried stream to the system.

5. A method of removing small amounts of water from a system in which low-boiling paraffin hydrocarbons are converted in the presence of a Friedel-Crafts type metal halide catalyst activated with hydrogen chloride, which comprises concentrating said water in a hydrogen chloride-rich stream containing less than about 1 mol per cent water based on the hydrogen chloride content, and contacting said stream with a liquid metal halide-hydrocarbon complex containing free metal halide at a temperature within the range of 75 to 175° F. to remove the water therefrom.

6. A method for the isomerization of normal butane which comprises passing a first stream comprising normal butane vapors into the bottom of a reaction zone containing a solid aluminum chloride catalyst for upward flow therethrough at isomerization conditions such that sufficient liquid aluminum chloride sludge is formed to drain from the catalyst, allowing said sludge to drain from said catalyst through a relatively large passageway into a lower sludge-accumulating zone, passing a second and separate vapor stream comprising at least 35 mol per cent hydrogen chloride and containing traces of water into said sludge accumulating zone for contact with said liquid sludge under conditions removing said water, and flowing the thus-dried second stream comprising hydrogen chloride-containing vapors in catalyst-activating amount upwardly through said relatively large passageway into said reaction zone for admixture with said first stream comprising butane vapors and passing the mixed streams through said reaction zone.

7. A method of drying a hydrogen halide-containing material which comprises contacting such a material, containing at least about 35 mol per cent hydrogen halide and less than about 1 mol per cent water based on the hydrogen halide content, with a liquid Friedel-Crafts type metal halide-hydrocarbon sludge at a temperature within the range of 75 to 175° F. to remove the water therefrom.

PERRY L. ROBERTS.

REFERENCES CITED

The following references are of record in the file of this patent:

UNITED STATES PATENTS

| Number | Name | Date |
|---|---|---|
| 2,281,924 | de Simo et al. | May 5, 1942 |
| 2,317,241 | Ackerman et al. | Apr. 20, 1943 |
| 2,330,206 | Dryer et al. | Sept. 28, 1943 |
| 2,330,754 | Skelton et al. | Sept. 28, 1943 |
| 2,339,685 | de Simo et al. | Jan. 18, 1944 |
| 2,343,406 | Dryer | Mar. 7, 1944 |
| 2,346,527 | Warrick et al. | Apr. 11, 1944 |
| 2,356,190 | Voorhies | Aug. 22, 1944 |
| 2,364,583 | de Simo et al. | Dec. 5, 1944 |